United States Patent [15] 3,650,472
Tontini et al. [45] Mar. 21, 1972

[54] THRUST CONTROL AND SOUND SUPPRESSION APPARATUS

[72] Inventors: Remo Tontini, San Diego; Raymond K. Johnsen, La Jolla, both of Calif.

[73] Assignee: Rohr Corporation, Chula Vista, Calif.

[22] Filed: Oct. 16, 1970

[21] Appl. No.: 81,263

[52] U.S. Cl. ................................239/265.13, 181/33 HB
[51] Int. Cl. ......................................................B64d 33/06
[58] Field of Search ..................239/265.11, 265.13, 265.19, 239/265.27, 265.17; 181/33 HB, 51

[56] References Cited

UNITED STATES PATENTS

| | | | |
|---|---|---|---|
| 3,027,710 | 4/1962 | Maytner | 239/265.13 UX |
| 3,568,792 | 3/1971 | Urquhart | 239/265.13 X |
| 3,568,794 | 3/1971 | Hilbig | 239/265.13 X |

Primary Examiner—Allen N. Knowles
Assistant Examiner—Michael Y. Mar
Attorney—George E. Pearson

[57] ABSTRACT

Engine of either turbo fan or turbojet type is provided with multiple lobed exhaust nozzle. An ejector barrel defining a mixing zone is adapted to be connected at its leading edge to the lobe tips adjacent to the nozzle exit plane to receive engine gases and free stream air. A plenum chamber in the forward portion of the barrel has inlet ports in flow communication with tip portions of lobes, and guide vanes extend forward into lobes to split the mixed engine gases and guide outer streams into plenum chamber inlet ports while inner streams flow directly to mixing zone. An annular control nozzle at aft end of plenum chamber discharges high pressure gases into intermediate section of mixing zone to form a gaseous ring surrounding the other gases. The high velocity flow at inner wall increases total flow and makes velocity profile more uniform, and further mixing with adjacent gases reduced sound level. Design of control nozzle determines profile of gaseous ring which becomes virtual aerodynamic profile of aft portion of ejector barrel, which may be convergent-divergent nozzle shape for optimum cruise conditions of a high subsonic aircraft. Nozzle may also be adjustable to produce varying profiles for varying flight regimes. Basic design makes it possible to incorporate thrust reverser in aft portion of ejector barrel.

11 Claims, 4 Drawing Figures

PATENTED MAR 21 1972 3,650,472

INVENTOR.
REMO TONTINI
BY  RAYMOND JOHNSEN

George E. Pearson
ATTORNEY

THRUST CONTROL AND SOUND SUPPRESSION APPARATUS

BACKGROUND OF THE INVENTION

This invention lies in the field of gas turbine or jet engines which produce reaction thrust by the high velocity rearward discharge of exhaust gases from the turbines. In order to obtain the maximum thrust from such an engine a great deal of study and calculation goes into the design of the exhaust nozzle, and for best results it must be tailored to the particular installation, taking into account the weight, speed, and other operating characteristics of the airplane on which it is mounted. In addition, the overall design must incorporate the maximum possible amount of sound suppression since the initial noise level produced by the engine is so high that it is very objectionable.

One way of increasing the thrust of such an engine is to design it so that the compressor delivers more air than the turbine uses, the excess flowing around the outside of the turbine and joining the turbine exhaust. The mixing of the two gases adds mass and reduces the velocity and temperature, with a resultant increase in thrust and reduction in noise level.

Another system includes the provision of an ejector ring or barrel which is larger than the exhaust nozzle outlet and is located aft of the outlet although it may overlap the nozzle to some extent. Free stream air enters the annular flow path defined by the ejector barrel and mixes with the exhaust gas, and also with the fan air if the engine is of the fan type. All of the gases mix within the barrel to increase thrust and reduce the noise level.

To attain optimum thrust under varying flight conditions of power and speed, the nozzle is often designed with mechanical means to vary the throat area or the discharge cone or both, and many problems arise because of the various moving parts which must operate reliably while being subjected to the flow of the very hot exhaust gas.

SUMMARY OF THE INVENTION

The present invention is directed particularly to the type of engine which incorporates an ejector barrel with or without the addition of the fan air feature. It improves the ejector action and makes it possible to use a shorter and lighter ejector barrel. In addition, it increases the total thrust and further decreases the noise, and also performs the function of the variable nozzle with simplicity and reliability.

Generally stated, the total apparatus includes a jet engine, provided with the fan air feature if desired, and having an exhaust nozzle which is substantially annular at its forward end for attachment to the engine. The nozzle is formed with a plurality of peripherally spaced axially and radially extending lobes defining between them a plurality of rearwardly converging valleys. Free stream air flows in through the valleys and mixes with the exhaust gases along an extended periphery at the exit plane of the nozzle. The air adds mass and reduces velocity as well as producing a mixture of lower temperature than the exhaust gases alone to reduce the noise level. In addition the intimate mixing of the air and gases further reduces the noise level in known manner.

An ejector barrel is provided which has a leading edge diameter substantially equal to the outside circle of the lobes and is attached at its leading edge to the lobe tips at the nozzle exit plane by welding or in any other suitable manner. The barrel is coaxial with the nozzle and immediately aft of it so that it defines a mixing zone to receive and control the air and engine gases while more intimate mixing is accomplished. Thus it serves as the ultimate nozzle and the jet issuing from it has improved thrust and greatly reduced noise level.

The effectiveness of the barrel is further increased by providing a plenum chamber within its forward portion, preferably in the form of a complete annulus. The forward edge of the plenum chamber is provided with inlet ports located to face directly into the radially outer portions of the lobes to receive the high pressure engine gases. Guide vanes extend forward into the aft ends of the lobes to split the engine gases and direct the outer streams into the inlet ports while the inner streams flow directly into the mixing zone. The forward edge of the plenum chamber is closed and rounded in the areas between lobes to confine the high pressure gases within the chamber and to reduce resistance to air flow. A control nozzle is formed by a series of slots or a single slot around the periphery at the aft end of the plenum chamber which is at a locus intermediate the leading and trailing edges of the barrel and is so formed as to discharge gas rearward and somewhat inward to form a gaseous control ring surrounding the mixture flowing through the barrel.

The gaseous ring performs several functions. It provides a high velocity boundary layer which improves flow through the aft portion of the barrel and increases thrust. It increases the velocity of the adjacent outer portion of the jet to make the velocity profile more uniform and decrease noise. It mixes with the outer portion of the jet to further reduce noise. In addition, it produces a virtual aerodynamic profile for the aft portion of the barrel, and this profile can be determined by the design of the control nozzle so that, for example, it may define a convergent-divergent nozzle suited for optimum cruise conditions of a high subsonic aircraft. The effective profile will vary with other powers and speeds and the control nozzle may be designed to give best results under these conditions. In addition, adjustable means may be provided to vary the flow area and effective shape of the control nozzle if desired.

Another very desirable feature of the apparatus is that thrust reversing means may be incorporated in the aft portion of the barrel since there is no movable structure to interfere with its placement or operation.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENTS

Figure 1:
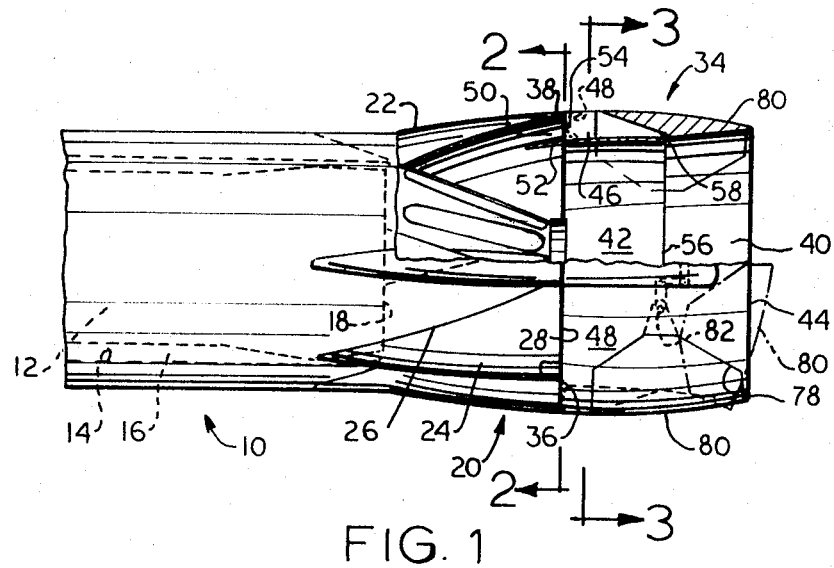
FIG. 1 is a schematic side elevational view of an engine assembly incorporating the invention.
Figure 2:
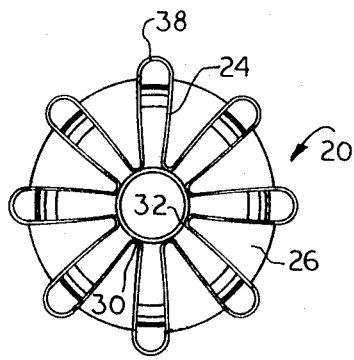
FIG. 2 is a view taken on line 2—2 of FIG. 1.

The assembly shown schematically in FIG. 1 includes a housing 10 enclosing a turbine 12 and a compressor, not shown, driven by the turbine. A sleeve 14 within the housing surrounds the engine to define a passage 16 for the rearward flow of fan air to join and mix with the gas issuing from the turbine outlet at 18, the outlet preferably being in a transverse plane as shown. In the case of a simple turbojet engine, sleeve 14 is omitted.

The basic exhaust nozzle 20 is of the lobed type and is generally annular at its forward end 22 where it is connected to the engine by way of welding or other securement to housing 10 in the vicinity of the turbine outlet plane 18. Aft of end 22 the body of the nozzle is formed with a plurality of peripherally spaced axially and radially extending lobes 24 which define between them a plurality of rearwardly converging valleys 26 forming flow paths for influx of free stream air which joins the engine gases at all points along the extended periphery 28 of the lobes to provide intimate mixing which adds mass, cools the mixture, and reduces the sound level. The mixing of fan air from passage 16 with the turbine gases from outlet 18 produces similar results, and these gases are mixed as they pass rearward through the lobes. The radially inner aft ends 30 of the lobes are secured to support ring 32 by welding or other suitable means. The lobes 24 all terminate preferably in a transverse plane as shown.

While the type of nozzle just described is superior to a simple cylindrical nozzle in improving both thrust and noise suppression, further improvements in both fields are needed for optimum results. Such improvements result from the addition of the ejector barrel 34 which is attached at its leading edge 36 to the radially outer rear tips 38 of the lobes and may be welded or otherwise secured. The inner wall 40 of the ejector barrel defines a mixing zone 42. Gases from lobes 24 with or without an admixture of fan air flow into the mixing zone, and free stream air flows through valleys 26 into the mixing zone. The confinement makes the mixing more complete so that when the gases finally exit from the trailing edge 44 the total sound reduction is very pronounced.

To further increase the effectiveness of the ejector barrel, it is provided in its forward portion with a plenum chamber 46 extending between inner wall 40 and outer wall 48 and preferably entirely around the periphery to form an annulus. This plenum chamber is open at spaced points around the periphery of its forward edge to define inlet ports 50 in registry with the radially outer portions of lobes 24 to receive high pressure gases therefrom. Those parts of the forward edge intermediate the lobes are closed and rounded to confine the high pressure gases and also to reduce resistance to the external air flow. Guide vanes 52 are provided to extend into the lobes, split the gases, and divert the radially outer streams into the inlet ports 50, while the radially inner streams flow directly into the mixing zone.

The construction of the plenum chamber includes a substantially cylindrical ring 52 which is the inner wall of the plenum chamber and is also the inner wall of the forward portion of the ejector barrel. The forward edge portion of ring 52 is axially slotted at a plurality of spaced points around the periphery to form a plurality of tongues. Alternate ones of these tongues extend forward into the aft ends of the lobes to become the guide vanes 50 mentioned above. The other set of alternate tongues are reversely curved outward to form rounded leading edge portions 54 and their free ends are secured to the outer wall 48 of the barrel to complete the confinement of the high pressure gases. These leading edge portions are located between the outer portions of the spaced lobes 24.

The aft edge 56 of the ring is spaced slightly forward of the adjacent edge of the aft portion of barrel inner wall 40 to form an annular control nozzle 58 through which the gases in the plenum chamber are discharged rearwardly and somewhat convergently to form a gaseous control ring which surrounds the main jet issuing from the ejector barrel. The size and shape of the nozzle opening are designed to produce optimum results for the particular installation. The operation is illustrated in the enlarged view of FIG. 4, which shows a modified form of control nozzle.

Figure 4:
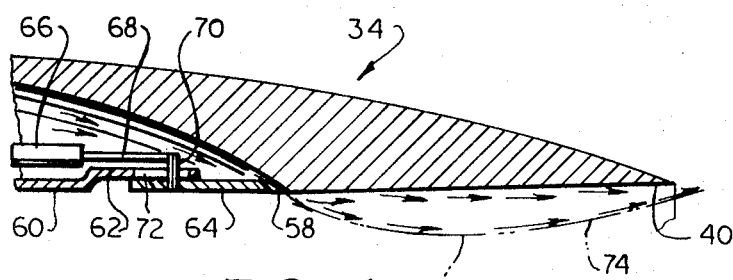
FIG. 4 is a schematic sectional view of an aft portion of the ejector barrel.

In FIG. 4 the ring 52 is replaced by ring 60 which is outwardly offset to form a support ring 62 carrying an axially movable control valve or ring 64. Movement of the latter is effected by actuator 66 having a piston rod 68 to which is connected a pin 70 extending through slot 72. Several actuators are provided at spaced points around the periphery to balance the forces on the ring 64. With the ring in any set position as shown the operation is the same as for the fixed ring of FIG. 1.

One feature of producing the peripheral gaseous control ring by discharge of high pressure gases from the peripheral control nozzle 58 is a high velocity boundary layer along inner wall 40 which increases the velocity of the outer portion of the main jet to increase the total thrust. It also makes the velocity profile of the total jet more uniform which decreases the noise level, and the mixing of the boundary layer with the main jet further reduces the noise level. By proper design of the flow area and effective angle of the opening of control nozzle 58 it is possible to aerodynamically form a virtual nozzle profile in the outline of a convergent-divergent nozzle as indicated by broken line 74 with the throat 76 to facilitate optimum cruise conditions for a high subsonic aircraft. The shape of the virtual nozzle will vary with varying power and speed conditions but will be close to optimum at all times. Where even closer control is desired because of a wider range of flight regimes the design of FIG. 4 may be used so that the control nozzle action may be varied in flight, including complete closure if desired. Other valving arrangements may be used to accomplish similar results.

Figure 3:
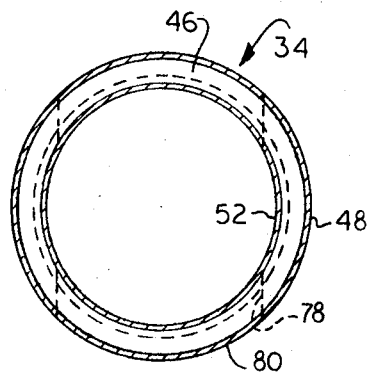
FIG. 3 is a view taken on line 3—3 of FIG. 1.

Another important advantage of the apparatus of this invention is that thrust reversing mechanism may readily be incorporated without interference with any of the features already described. As shown in FIGS. 1 and 3, passages 78 are formed in the ejector barrel extending through its inner and outer walls and a blocker door 80 is located in each passage and pivoted at 82 on a transverse axis. The doors are swingable rearwardly and toward each other to block rearward flow of the main jet and divert the gases laterally out through passages 78 to produce reverse thrust. Details of the mechanism are not a part of the present invention but are fully disclosed in the patent application of Felix Hom for Unitary Ejector Thrust Reverser Assembly for Jet Propulsion Engine, Ser. No. 785,525, filed Dec. 20, 1968, now U.S. Pat. No. 3,531,049.

It will be noted that the ejector barrel and its components form a complete unitary apparatus which may be applied to any engine assembly which is already provided with a lobe type exhaust nozzle to provide all of the additional benefits set out herein. When a thrust reverser is included, it need not be of the specific type illustrated and described above.

Having thus described the invention, what is claimed as new and useful and is desired to be secured by U.S. Letters Patent is:

1. Apparatus for controlling the thrust and suppressing the sound of a jet engine, comprising: a nozzle connected to the aft end of the engine to receive high pressure gases therefrom and discharge them rearwardly; the nozzle having a generally annular forward end for connection to the engine and being formed with a plurality of peripherally spaced axially and radially extending lobes forming rearward flow paths for the engine gases; the lobes defining between them a plurality of rearwardly converging valleys forming flow paths for the influx of free stream air to join the engine gases at the nozzle exit plane; and a generally annular ejector barrel having inner and outer walls and a leading edge and a trailing edge, and attached at its leading edge to the outer tips of the lobes substantially at the nozzle exit plane; the inner wall of the ejector barrel defining a mixing zone to receive and control the engine gases and free stream air; a generally annular plenum chamber formed between the inner and outer walls of the forward portion of the ejector barrel; inlet ports in the forward edge of the plenum chamber in flow communication with the radially outer tip ends of the lobes to receive portions of the engine gases; and rearwardly directed control nozzle means at the aft end of the plenum chamber at a locus intermediate the ends of the ejector barrel extending substantially around the periphery of the inner wall of the ejector barrel to discharge a ring of high pressure gases surrounding the mixture of free stream air and engine gases issuing from the engine nozzle and aerodynamically defining the effective profile of the aft portion of the inner wall of the ejector.

2. Apparatus as claimed in claim 1; and guide vanes extending into the aft ends of the lobes near their radially outer portions to divide the gaseous streams in the lobes and guide the outer portions of the streams into the inlet ports of the plenum chamber.

3. Apparatus as claimed in claim 2; in which the guide vanes comprise forward continuations of portions of the inner wall of the plenum chamber.

4. Apparatus as claimed in claim 3; in which the forward edge of the plenum chamber is closed and streamlined in the areas between the lobes to confine the high pressure gases in the plenum chamber and to reduce resistance to external air flow.

5. Apparatus as claimed in claim 1; in which the inner wall of the plenum chamber comprises a substantially cylindrical ring forming the inner wall of the forward portion of the ejector barrel; peripherally spaced portions of the ring extend forwardly into the aft portions of the lobes to serve as guide vanes dividing the flows and directing the radially outer portions into the inlet ports of the plenum chamber; and the peripherally spaced intermediate portions of the ring are reversely curved to close the forward edge of the plenum chamber between the lobes and their free ends are secured to the outer wall of the ejector barrel.

6. Apparatus as claimed in claim 1; and means to control the flow of high pressure gases from the plenum chamber into the mixing zone.

7. Apparatus as claimed in claim 6; in which the flow control means comprises a ring forming the forward marginal edge of the control nozzle means; the ring being axially movable to vary the area and effective shape of the control nozzle opening.

8. Apparatus as claimed in claim 1; the engine including a turbine discharge opening and a fan air discharge opening both exhausting into the engine nozzle to cause mixing of the fan air and turbine gases in the lobes prior to discharge into the mixing zone of the ejector barrel.

9. Apparatus as claimed in claim 1; including passages in the aft portion of the ejector barrel extending through its inner and outer walls; and a blocker door pivotally mounted in each passage on a transverse axis; the doors being swingable rearward and inward toward each other to block rearward flow of the gases from the mixing zone and divert them laterally out through the passages to produce reverse thrust.

10. Thrust controlling and sound suppressing apparatus for use in combination with a jet engine having an exhaust nozzle formed with peripherally spaced lobes defining between them valleys for influx of free stream air, comprising: an ejector barrel having inner and outer walls and leading and trailing edges; the inner wall defining a mixing zone for engine gases and free stream air; the leading edge of the ejector barrel being adapted to be connected to the outer tips of the lobes to provide for inflow of free stream air; a plenum chamber in the forward portion of the ejector barrel having forward opening inlet ports adapted for flow communication with the radially outer portions of the lobes; and guide vanes carried by the ejector barrel to extend into the lobes and divide the gases into outer streams flowing into the inlet ports and inner streams flowing directly into the mixing zone; and a substantially annular control nozzle at the aft end of the plenum chamber to exhaust gases therefrom into the mixing zone in a ring surrounding the mixed gases.

11. Apparatus as claimed in claim 10; including passages in the aft portion of the ejector barrel extending through its inner and outer walls; and a blocker door pivotally mounted in each passage on a transverse axis; the doors being swingable rearward and inward toward each other to block rearward flow of the gases from the mixing zone and divert them laterally out through the passages to produce reverse thrust.

* * * * *